April 12, 1966     E. B. NICHOLS     3,245,441
MACHINE FOR MAKING BOWLING PINS
Filed May 14, 1962                        2 Sheets-Sheet 1

*INVENTOR.*
EDGAR B. NICHOLS
BY
ATTORNEYS

April 12, 1966   E. B. NICHOLS   3,245,441
MACHINE FOR MAKING BOWLING PINS

Filed May 14, 1962   2 Sheets-Sheet 2

INVENTOR.
EDGAR B. NICHOLS
BY
Pennie, Edmonds, Morton, Barrows & Taylor
ATTORNEYS

3,245,441
MACHINE FOR MAKING BOWLING PINS
Edgar B. Nichols, 325 W. Main St., Moorestown, N.J.
Filed May 14, 1962, Ser. No. 194,249
11 Claims. (Cl. 144—93)

This invention relates to machines for making bowling pins which are the same in shape and size and also of the same weight notwithstanding differences in the specific gravity of the wood. The conventional bowling pins as now used consist of solid billets of wood, usually hard maple, of uniform shape and dimensions. Such pins, however, vary considerably in weight due to the fact that the specific gravity of wood, even from logs of the same species from the same grove, is quite variable, and to determine the specific gravity of the log and to select logs of substantially the same specific gravity add prohibitively to the manufacturing cost. Hence, although it is desirable that the pins be of uniform weight as well as shape and dimensions, fairly wide weight tolerances are allowed.

The object of the present invention is to provide a machine for making bowling pins of uniform weight, shape and dimensions, although made of woods of different specific gravity.

A further object of the invention is to provide a machine for making such pins which is of simple construction, and readily operated by unskilled labor with satisfactory results.

A further object of the invention is to provide a machine for the purposes stated with which conventional solid pins of the same shape and dimensions, but different weights, may all be reduced to the same weight without change in shape and dimensions. In the accompanying drawings I have shown a preferred embodiment of my machine as now used in making my improved pins, and in the drawings.

Figure 1:
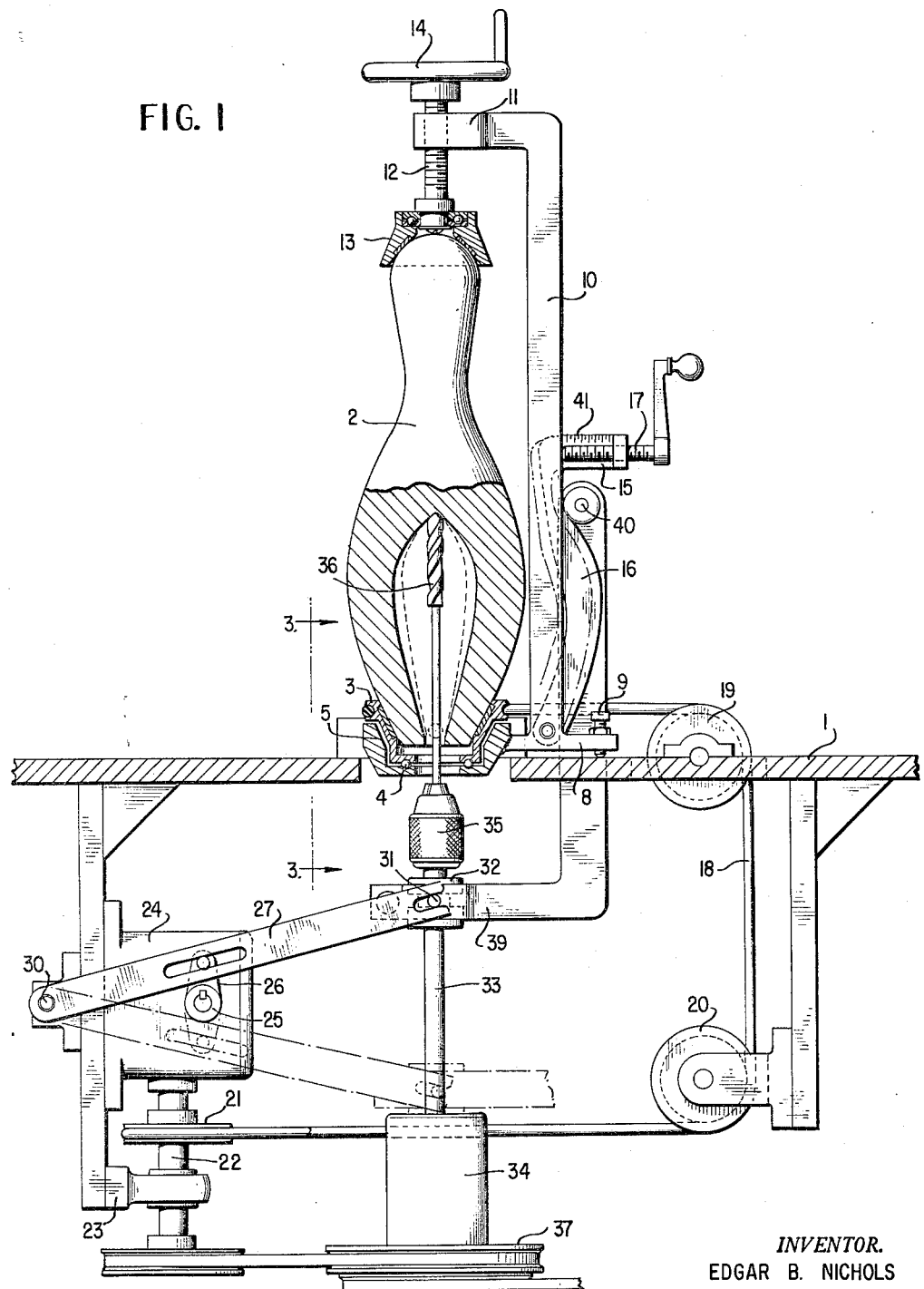
FIG. 1 is a side elevation of my machine with certain parts in section and also showing my improved pin partly in section.
Figure 2:
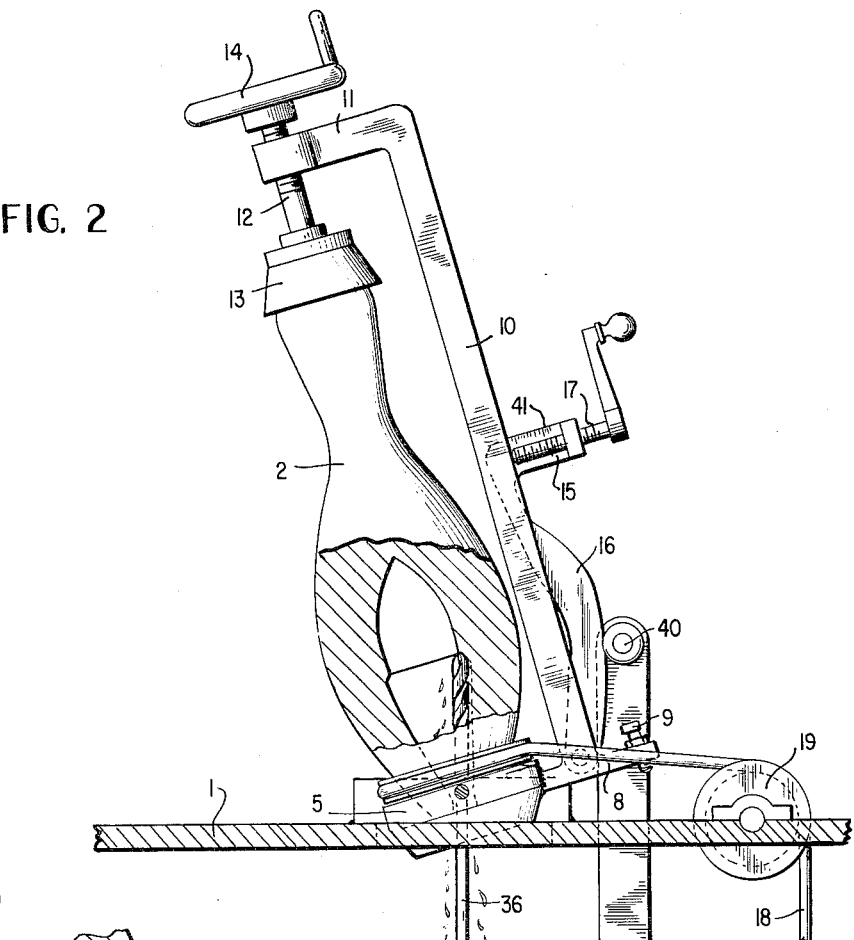
FIG. 2 is a similar view, showing the parts in mid-position and the pin partially completed.
Figure 3:
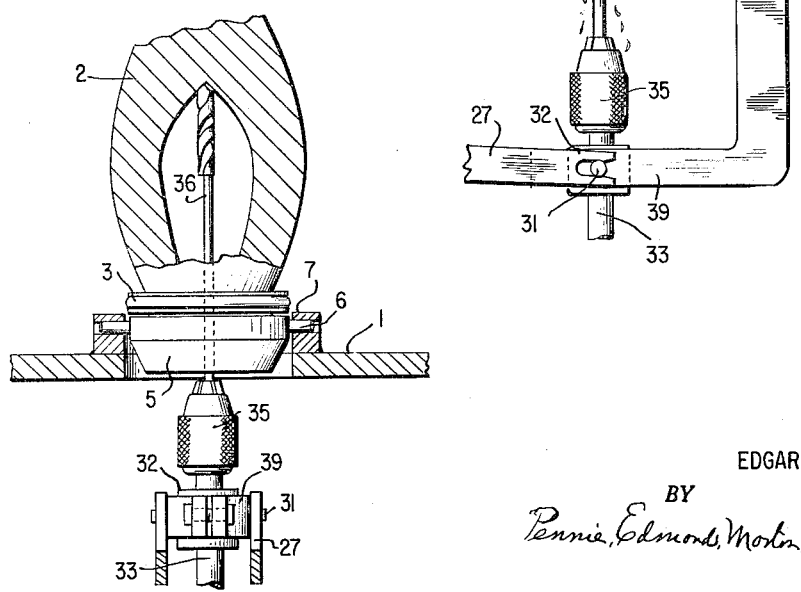
FIG. 3 is a sectional view on line 3—3 of FIG. 1.

My improved pin is, briefly stated, a conventional solid wooden pin with a portion of the wood removed axially from the body of the pin, the amount removed being dependent upon the specific gravity of the wood. I have discovered that if the cavity resulting from the removal of the wood is concentric with the axis of the pin and extends above the plane of maximum diameter with the greatest diameter of the cavity in the same plane as the greatest diameter of the pin, the pins will behave the same in use notwithstanding differences in the size of the cavity within a substantial range. Hence, my improved pins may be made of the same shape, dimensions and weight from billets of substantially different specific gravity.

Referring now to the drawings, 1 indicates the bed plate of the machine which is supported on legs, not shown, at a convenient height for the operator to place the pins 2 in the holder 3. The pin holder 3 is a cup-shaped member mounted for rotation about its vertical axis on ball bearings 4 in an outer cup-shaped member 5. The outer member 5 is mounted for tilting movement about a horizontal axis by means of diametrically-opposite pivot pins 6 working in bearing blocks 7 fixed to the bed plate 1. Projecting diametrically from the member 5 in a plane at right angles to the axis of the pivot pins 6 is an arm 8 having at its outer end a leveling screw 9. A bar 10 integral with the arm 8 extends upwardly from the arm between the cup 5 and the leveling screw 9, and has at its upper end a horizontal portion 11 whose end extends over the pin holder 3. Threaded in the end of the part 11 in alignment with the axis of rotation of the holder 3 is a shaft 12 to the lower end of which is attached an inverted cup member 13 shaped to fit the upper end of the pin 2. A crank wheel 14 is attached to the upper end of the shaft 12. The holder 3 is shaped to fit the lower end of the pin with the bottom surface of the pin about one inch below the axis of the pivot pins 6.

Pivoted to the arm 8 at the base of the bar 10 is a cam member 15 whose cam surface 16 corresponds to the curvature of the body portion of the pin in the plane of a vertical diameter. The cam member 15 is provided at its upper end with an adjusting screw 17, whose inner end engages the edge of the bar 10 to thereby vary the angle of the cam with respect to the vertical.

The pin holder 3 is rotated by means of a belt 18 which is extensible and may be of rubber or an extensible spring. The holder 3 is grooved around its upper edge to receive the belt, and from the holder 3 the belt passes over pulley 19 mounted on the bed plate 1, thence down through the bed plate over pulleys 20 beneath the bed plate to a driving pulley 21 on a vertical shaft 22 supported by a hanger 23 depending from the bed plate.

Also mounted on the hanger 23 is a gear box 24 in which is supported a crankshaft 25 whose crank 26 continuously oscillates a crank lever 27. The crankshaft 25 is driven from the shaft 22 through a reducing gear, not shown.

The crank lever 27 is pivoted to the hanger at 30 and at its free end has a pin and slot engagement, as indicated at 31, with a collar 32 attached to a vertical shaft 33, mounted for rotation and axial movement in a housing 34 beneath the bed plate 1. The axis of the shaft is aligned with the axis of the pin 2 when the pin is in vertical position at the beginning of the boring operation. The shaft 33 is provided at its upper end with a chuck 35 for a bit 36.

At the lower end of the shaft 33 are two pulleys 37, 38. The belt 18 passes around pulley 38, and a belt from a source of power not shown passes around pulley 37. The pulleys 37, 38 are splined on the shaft 33 for rotation with the shaft but are held against axial movement with the shaft by their bearings in the housing 34. By this arrangement, the pin holder 3 is continuously rotated; the bit 36 is continuously rotated in the opposite direction, and the bit is reciprocated up and down through a distance sufficient to raise the cutting end of the bit above the plane of greatest diameter of the bowling pin.

Surrounding the collar 32 and projecting laterally therefrom is a two-piece, L-shaped arm 39 whose vertical branch extends upwardly through a hole in the bed plate 1 adjacent the cam 15. The pins 31 are fixed on the arm 39. A cam-engaging roller 40 is mounted in the upper end of the arm 39 and as the roller moves upwardly the bowling pin 2 will be tilted to the left, as shown in FIG. 1, to an extent depending on the adjustment of the cam as affected by the screw 17. A scale 41 is provided for the screw and this scale is calibrated in figures indicating the quantity of the wood removed at each setting of the cam.

In operation, the pins to be processed are weighed and the excess weight of each pin over the desired weight is marked on the bottom of the pin. The pin is then clamped in the holder 3 and the cam-adjusting screw 17 set at zero position, at which position the end of the screw is out of contact with the bar 10 and no part of the cam 15 is engaged by the cam roller. The machine is then started and the bit 36 will be raised by the crank lever as the pin and bit are rotated in opposite directions thereby boring a hole axially of the pin to a distance somewhat above the plane of the pin's largest diameter. As the bit is withdrawn on the downward movement of the crank lever, the shavings will be removed and when the bit is at its lowermost position the operator rotates the adjusting screw one turn to thereby tilt the cam 15 so that its widest portion is in the path of movement of the cam roller 40 and the hole bored on the first movement of the bit will be widened somewhat. When the bit is withdrawn at the end of the second boring, the adjusting screw 17 will be given another turn, thereby tilting the cam 15 another step, and so on until the desired amount of wood has been removed as indicated by the scale 41.

The weight of wood removed by the first boring operation with a half-inch bit is less than one percent of the total weight of a pin of standard size, and if the pin is less than one percent greater than the desired weight, it will not be bored at all. The pitch of the screw 17 is such that each subsequent boring will also reduce the weight by less than one percent so that by the use of my improved apparatus the weight variation of the finished pins will be less than one percent.

In the foregoing specification and accompanying drawings, I have described and shown a specific embodiment of my pin-boring apparatus as now in use. It will be understood, however, that my invention is not limited to such embodiment except insofar as recited in the appended claims.

I claim:

1. A machine for boring bowling pins having in combination a holder for base of the pin, means for rotating said holder about an axis coincidental with the axis of the pin in said holder, said holder having an opening in line with the axis of the pin, a rotatable chuck for a boring bit beneath said opening, the axis of rotation of said chuck in line with the axis of rotation of said holder in one relative position of said chuck and holder, means for relatively moving said chuck and holder along said common axis to advance a bit in said chuck axially into and out of a pin in said holder; and means for relatively tilting said chuck and holder during the advance of said bit into said pin about an axis transverse to and intersecting the axis of rotation of said bit so that the axes of rotation of the bit and pin in the holder are at an angle to each other.

2. The machine of claim 1 wherein the axis of tilting is in the same plane as the base of the pin in the holder when the axes of rotation of the pin and chuck are aligned.

3. The machine of claim 1 wherein the means for relatively tilting the holder and chuck during the advance of the bit into the pin relatively tilt the holder and the chuck from a position in which the axes of rotation of the bit and pin are aligned at the beginning of the boring operation back to such a position at the end of such advance.

4. The machine of claim 3 wherein the maximum relative tilt of the chuck and holder occurs when the cutting end of the bit is in the plane of the maximum diameter of the pin.

5. The machine of claim 1 wherein means are provided for varying the amplitude of the tilting movement during the boring operation.

6. The machine of claim 3 wherein means are provided for varying the amplitude of the tilting movement during the boring operation.

7. In a machine of the class described, a support for the base of a bowling pin, said support being rotatable about an axis coincidental with the axis of a bowling pin mounted on said support, said support being tiltable about an axis coincidental with a diameter of the base surface of said pin, a chuck for a boring bit supported beneath said pin support and movable up and down in a vertical path in line with the center of the base of a pin in said support, means for rotating said chuck and means carried by said chuck for effecting a tilting of said pin support during the up and down movement of said chuck.

8. The machine of claim 7 wherein said last named means comprises a cam attached to said pin support and a cam engaging roller attached to said chuck.

9. The machine of claim 8 wherein said cam and said roller are relatively adjustable to vary the amplitude of the tilting movement.

10. The machine of claim 8 wherein the cam consists of a vertical bar with its cam surface conforming substantially with the vertical contour of the pin.

11. The machine of claim 10 wherein the cam bar is mounted for adjustment toward and away from the pin.

References Cited by the Examiner

UNITED STATES PATENTS

| | | | |
|---|---|---|---|
| 874,507 | 12/1907 | Highsmith | 77—19 |
| 1,057,819 | 4/1913 | Garlock | 144—93 |
| 1,221,552 | 4/1917 | McCann | 77—3 |
| 1,497,579 | 5/1924 | Muchlmatt | 77—19 |
| 2,246,411 | 6/1941 | Kraft | 273—82 |
| 2,283,469 | 5/1942 | Shepard | 77—67 |
| 2,309,532 | 1/1943 | Phillips | 144—2.7 |
| 2,651,975 | 9/1953 | Soloff | 77—63 X |
| 2,775,456 | 12/1956 | Schroeder et al. | 273—82 |

DONALD R. SCHRAN, *Primary Examiner.*

DELBERT B. LOWE, WILLIAM W. DYER, JR.,
*Examiners.*

G. L. BRICE, *Assistant Examiner.*